United States Patent
Barbaric et al.

(10) Patent No.: US 10,007,815 B2
(45) Date of Patent: Jun. 26, 2018

(54) PRODUCTION METHOD, RFID TRANSPONDER, AUTHENTICATION METHOD, READER DEVICE AND COMPUTER PROGRAM PRODUCT

(71) Applicant: NXP B.V., Eindhoven (NL)

(72) Inventors: Tvrtko Barbaric, San Jose, CA (US); Hans de Jong, Eindhoven (NL); Ad Arts, Heeze (NL); Peter Bukovjan, Graz (AT)

(73) Assignee: NXP B.V., Eindhoven (NL)

( * ) Notice: Subject to any disclaimer, the term of this patent is extended or adjusted under 35 U.S.C. 154(b) by 400 days.

(21) Appl. No.: 13/924,356

(22) Filed: Jun. 21, 2013

(65) Prior Publication Data

US 2013/0342311 A1 Dec. 26, 2013

(30) Foreign Application Priority Data

Jun. 21, 2012 (EP) .................................... 12172945

(51) Int. Cl.
*G06K 7/10* (2006.01)
*G06K 19/07* (2006.01)
(Continued)

(52) U.S. Cl.
CPC ....... *G06K 7/10009* (2013.01); *G06K 19/073* (2013.01); *G06K 19/0723* (2013.01);
(Continued)

(58) Field of Classification Search
CPC ............. G06K 19/0723; G06K 19/073; G06K 7/10009; H04L 2209/805; H04L 63/0823;
(Continued)

(56) References Cited

U.S. PATENT DOCUMENTS 9,013,266 B2 4/2015 Griffiths-Harvey et al.
2005/0049979 A1* 3/2005 Collins et al. .................. 705/75
(Continued)

FOREIGN PATENT DOCUMENTS

CN 1728162 A 2/2006
CN 101520865 A 9/2009
(Continued)

OTHER PUBLICATIONS

Pearson, J.; "Securing the Pharmaceutical Supply Chain with RFID and Public-Key Infrastructure (PKI) Technologies"; Texas Instruments Radio Frequency Identification (TI-RFid™) Systems; RFIDPH01—Jun. 2005 White Paper (12 pages).*

(Continued)

*Primary Examiner* — Edwin Holloway, III

(57) ABSTRACT

The exemplary embodiments of the invention realize an efficient prevention of massive infiltration of cloned RFID transponders into existing and new RFID systems. Furthermore, reader devices used for authentication of RFID transponders do not need to be on-line and do not need to be equipped with a Security Authentication Module (SAM). This simplifies authentication procedures and reduces costs. According to an exemplary embodiment of the invention a transponder-specific originality signature is stored by a transponder manufacturer on the transponder. The transponder-specific originality signature may, for example, be stored in the non-volatile memory (EEPROM) of the transponder during the fabrication of the transponder. This transponder-specific originality signature can be checked at any time in a convenient way, which provides an indication of originality of said transponder.

11 Claims, 2 Drawing Sheets

(51) Int. Cl.
*G06K 19/073* (2006.01)
*H04L 9/32* (2006.01)
*H04W 12/06* (2009.01)
*H04L 29/06* (2006.01)
*H04W 12/10* (2009.01)

(52) U.S. Cl.
CPC .......... *H04L 9/3247* (2013.01); *H04W 12/06* (2013.01); *H04L 63/0823* (2013.01); *H04L 63/126* (2013.01); *H04L 2209/805* (2013.01); *H04W 12/10* (2013.01)

(58) Field of Classification Search
CPC .... H04L 9/3247; H04L 63/126; H04W 12/06; H04W 12/10
USPC .......................................................... 340/5.8
See application file for complete search history.

(56) References Cited

U.S. PATENT DOCUMENTS

2008/0069347 A1* 3/2008 Brown ................. H04L 9/3066
380/45
2009/0096574 A1* 4/2009 Oberle .......................... 340/5.8
2010/0109851 A1* 5/2010 Burbridge et al. ........ 340/10.42
2012/0099725 A1* 4/2012 Sakazaki et al. ............... 380/28

FOREIGN PATENT DOCUMENTS

| CN | 101535845 A | 9/2009 |
| CN | 101593265 A | 12/2009 |
| CN | 102063633 A | 5/2011 |
| CN | 102326355 A | 1/2012 |

OTHER PUBLICATIONS

"ISO/IEC 14443-3, Part 3—Initialization and Anticollision", ISO/IEC, 48 pgs, retrieved from the internet at: www.waazaa.org/download/fcd-14443-3.pdf (Jun. 11, 1999).

Extended European Search Report for Patent Appln. No. 12172945.3 (Nov. 22, 2012).

Office Action for CN Counterpart Appln. No. 201310243208.1 (dated Dec. 25, 2015).

"Mifare" NXP Semiconductors, 1 pg, retrieved from the internet Jan. 29, 2015 at: www.mifare.net.

* cited by examiner

PRODUCTION METHOD, RFID TRANSPONDER, AUTHENTICATION METHOD, READER DEVICE AND COMPUTER PROGRAM PRODUCT

CROSS-REFERENCE TO RELATED APPLICATIONS

This application claims the priority under 35 U.S.C. § 119 of European patent application no. 12172945.3, filed on Jun. 21, 2013, the contents of which are incorporated by reference herein.

FIELD OF THE INVENTION

The invention relates to a method for producing an RFID transponder. The invention further relates to an RFID transponder produced by such a method. The invention further relates to a method for authenticating an RFID transponder. The invention further relates to a reader device for reading an RFID transponder. The invention further relates to a computer program product.

BACKGROUND OF THE INVENTION

Radio Frequency Identification (RFID) transponders are widely used in fields such as transport (ticketing, road tolling, baggage tagging), finance (debit and credit cards, electronic purse, merchant card), and tracking (access control, inventory management, asset tracking) RFID transponders are for example proximity integrated circuit cards (PICCs) as defined in the standard ISO14443.

The international standard ISO14443 is an important industry standard for contactless smart cards. ISO14443-compliant products such as MIFARE provide radio frequency communication technology for transmitting data between transponders and reader devices. An example of a reader device is a Proximity Coupling Device (PCD) as defined in the standard ISO14443.

For example, in electronic ticketing for public transport, travelers wave their PICC over a reader device at the turnstiles or entry points, benefiting from improved convenience and speed in the ticketing process. Such products are set to be the key to individual mobility in the future, supporting multiple applications including road tolling, airline tickets, access control and many more. High-end RFID transponders—such as smart cards—are typically used for applications with high security requirements, while simpler RFID transponders—such as so-called RFID tags—are low-cost oriented. Therefore, RFID tags are useful for applications with lower security requirements.

Normally, low-cost RFID tags do not have authentication capabilities based on secure encryption methods, such as methods based on the Triple Data Encryption Standard (3DES) or the Advanced Encryption Standard (AES). Therefore, these low-cost RFID tags have only limited means to prevent their massive cloning.

Typically, the authentication (proof of originality) of RFID tags is based on checking specific characteristics of those tags, for example by analyzing the timing behavior of specific operations or by searching for hidden features on the tags. A drawback of this approach is that those characteristics and features may be discovered and replicated by a third party attempting to clone the tags. Another drawback is that new versions or generations of the same tags do not necessarily have those specific characteristics and features, because they are typically not part of the maintained product functionalities and they are sometimes not reproducible, for example because the new versions or generations of the tags are normally based on newer semiconductor technologies, which result in different electrical properties.

The cloning of RFID tags is harmful for all companies that provide genuine RFID solutions, because it decreases their revenue and, as a result, it slows down the return on their investments. It also destroys the public image of RFID technology as a secure technology. Therefore, it is important that RFID tag manufacturers are able to reduce such cloning.

SUMMARY OF THE INVENTION

It is an object of the invention to reduce the massive cloning of RFID transponders. This is achieved by a method for producing an RFID transponder as defined in claim 1, a method for authenticating an RFID transponder as defined in claim 5, and a non-transitory medium comprising instructions which, when being executed by a processing unit, carry out or control respective steps of a method for authenticating an RFID transponder as defined in claim 9.

According to an aspect of the invention, a method for producing an RFID transponder is conceived, the method comprising the following steps: providing the transponder with a transponder-specific identifier; providing the transponder with a signature usable for authentication of the transponder; generating said signature by signing at least a part of the transponder-specific identifier.

According to an exemplary embodiment of the method for producing an RFID transponder, the signature is generated by signing at least a part of the transponder-specific identifier with a private key of a private-public key pair.

According to a further exemplary embodiment of the method for producing an RFID transponder, the private-public key pair is based on any one of Elliptic Curve Cryptography, RSA cryptography, NTRU cryptography, and the Digital Signature Standard.

According to a further exemplary embodiment of the method for producing an RFID transponder, the transponder-specific identifier comprises at least a part of the unique identification number of the transponder.

According to a further exemplary embodiment of the method for producing an RFID transponder, the signature is stored in an internal memory of the transponder.

According to a further aspect of the invention an RFID transponder is conceived, which has been produced by a method of the kind set forth.

According to a further aspect of the invention a method for authenticating an RFID transponder is conceived, wherein the authentication is performed by: reading a transponder-specific identifier or a part of the transponder-specific identifier from the transponder; reading a signature from the transponder, said signature comprising the transponder-specific identifier or said part of the transponder-specific identifier in signed form; verifying the signature and determining that the transponder is authentic only if the signature is valid.

According to an exemplary embodiment of the method for authenticating an RFID transponder, the signature has been generated by signing the transponder-specific identifier or said part of the transponder-specific identifier with a private key of a private-public key pair, and the signature is verified with the public key of said private-public key pair.

According to a further exemplary embodiment of the method for authenticating an RFID transponder, the private-public key pair is based on any one of Elliptic Curve Cryptography, RSA cryptography, NTRU cryptography, and the Digital Signature Standard.

According to a further exemplary embodiment of the method for authenticating an RFID transponder, the transponder-specific identifier comprises at least a part of the unique identification number of the transponder.

According to a further aspect of the invention a reader device for reading an RFID transponder is conceived, wherein the reader device is arranged to carry out or control respective steps of a method of the kind set forth.

According to a further aspect of the invention a computer program product is conceived, the computer program product comprising instructions which, when being executed by a processing unit, carry out or control respective steps of a method of the kind set forth.

BRIEF DESCRIPTION OF THE DRAWINGS

The invention will be described in more detail with reference to the appended drawings, in which.

DESCRIPTION OF EMBODIMENTS

Figure 1:
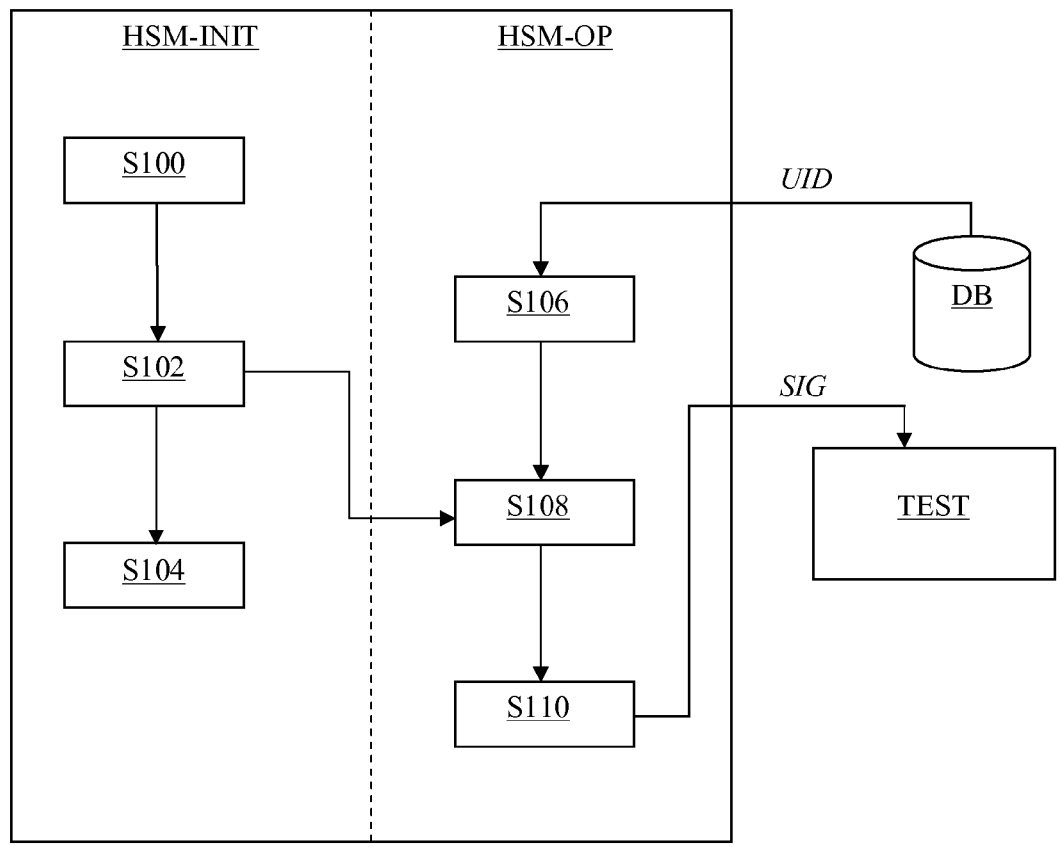
FIG. 1 illustrates a procedure for initializing RFID transponders in accordance with an exemplary embodiment of the invention.

The exemplary embodiments of the invention realize an efficient prevention of massive infiltration of cloned RFID transponders into existing and new RFID systems. Furthermore, reader devices used for authentication of RFID transponders do not need to be on-line and do not need to be equipped with a Security Authentication Module (SAM). This simplifies authentication procedures and reduces costs.

According to an exemplary embodiment of the invention a transponder-specific originality signature is stored by a transponder manufacturer on the transponder. The transponder-specific originality signature may, for example, be stored in the non-volatile memory (EEPROM) of the transponder during the fabrication of the transponder. This transponder-specific originality signature can be checked at any time in a convenient way, which provides an indication of originality of said transponder.

It should be noted that the infiltration of individual cloned transponders into RFID systems cannot be prevented completely, because the transponder identifier and the transponder-specific signature can be read out by anyone and can be copied into a falsified transponder. However, the identifier typically uniquely identifies a transponder, or, in other words, the identifier shall normally be different for each transponder and the RFID systems typically detect the reoccurred presence of transponder(s) with the same identifier.

The way in which massive infiltration of cloned transponders into RFID systems is prevented using the transponder-specific originality signature can be illustrated as follows. In prior art RFID systems—i.e. in RFID systems in which no transponder-specific originality signature of the kind set forth is used—a plurality of cloned transponders can be produced by copying the content of a single genuine transponder to a plurality of blank transponders. Since the presence of a large number of RFID transponders having the same identifier raises suspicion of fraud, the identifier of each cloned transponder will typically be altered or replaced by the producer of the clones. If the transponder-specific originality signature is used, this approach will not succeed. The content of a single genuine transponder can still be copied to a plurality of blank transponders and the identifier of each cloned transponder can still be altered or replaced, but in that case the cloned transponders will not pass the originality check according to the invention. Altering or replacing the transponder-specific originality signature of the cloned transponders such that they pass the originality check is not possible, because only the manufacturer of the genuine transponders has the private key, which is necessary to generate a valid signature. Therefore, the probability that massive fraud takes place is relatively low.

According to an exemplary embodiment of the invention, the signature is a signed transponder-specific identifier or a specific part of this number. For example, the identifier may be the Unique Identification Number (UID) of the transponder or a specific part of this number. Alternatively, the identifier may be based on other device-specific data, such as a lot number, a wafer number, or a Cartesian coordinate of the device on the wafer. The identifier is signed with a private key using an asymmetric cryptographic method, such as Elliptic Curve Cryptography (ECC) or another asymmetric cryptographic method. Examples of other asymmetric cryptographic methods are RSA and NTRU. The identifier may also be signed by means of a digital signature in accordance with the Digital Signature Standard (DSS). The skilled person will appreciate that other transponder-specific identifiers may be used as well.

The reader device can read the signature from the transponder once it selects the transponder. The reader device verifies the signature with the corresponding public key and compares it with the identifier or part of the identifier. If the verified signature corresponds to the identifier or a specific part of the identifier, then the transponder will be declared by the reader device as genuine.

The use of asymmetric cryptography instead of symmetric cryptography improves the reliability of the authentication method. Furthermore, the authentication method becomes easy to implement by both the RFID transponder manufacturer as well as by any reader device. If symmetric cryptography is used and the encryption key—known, in that case, also to a customer performing the authentication, e.g. using reader devices—leaks, then a third party will be able to reproduce pairs of identifiers and signatures. Such pairs would—but should not—pass the originality check, i.e. the authentication. The use of asymmetric cryptography with public keys improves the reliability, because the public keys cannot be used for the signing. The private key used for the signing remains stored in a secured environment at the transponder-manufacturer site. The use of asymmetric cryptography also makes it possible to generate different public keys for different customers and to keep a single private key at the transponder-manufacturer site. This feature contributes significantly to the relatively low cost of the fabricated transponder.

FIG. 1 illustrates a procedure for initializing RFID transponders in accordance with an exemplary embodiment of the invention. In particular, an example of a method for generating a signature in accordance with the invention is shown, which uses a Hardware Security Module (HSM) to calculate the signature for each transponder, which is later stored by the initialization patterns on each transponder by test machines. In this example, it is assumed that the identifier is the unique identifier of the transponder (UID), but it is also possible to use a subset of UID bits or another transponder-specific number, for example. The identifier is signed with the private key in order to generate the signature.

The signature may be stored in an internal memory of the transponder, such that it is accessible by means of regular read commands. This is especially useful for already existing products. For products that are under development the signature may be stored in a hidden memory of the transponder, such that it is only accessible by means of dedicated commands. This allows for more convenience in the handling of the signatures and it prevents alteration of the signatures by customers.

In particular, FIG. 1 shows exemplary steps of a procedure for initializing a transponder. Specifically, it shows how to generate and store a signature on the transponder. In an initialization phase HSM-INIT of the hardware security module (HSM), a private-public key pair is generated S100, a backup of the private key is stored in the HSM S102, and the public key is exported to customers S104. In an operational phase HSM-OP of the HSM, a full or a partial unique identifier UID is received S106 from a UID database DB, an ECC signature is calculated S108 by signing the full or partial UID with the private key PK, and the ECC signature SIG is returned S110 to the wafer tester TEST. The wafer tester TEST stores the pair UID with ECC signature SIG on the transponder.

Figure 2:
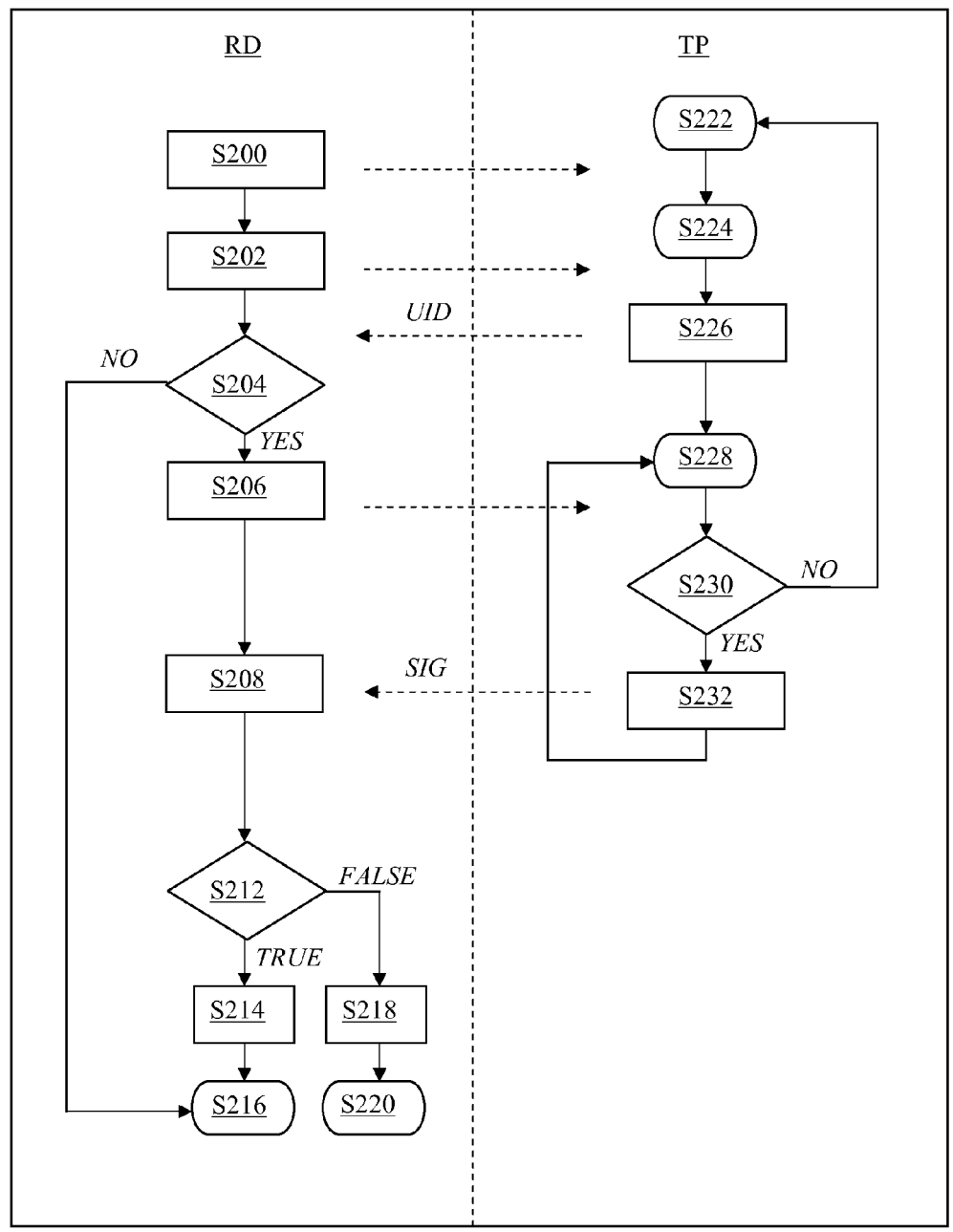
FIG. 2 illustrates a procedure for authenticating RFID transponders in accordance with an exemplary embodiment of the invention.

FIG. 2 illustrates a procedure for authenticating RFID transponders in accordance with an exemplary embodiment of the invention. In particular, it shows an example of an authentication method, which is applicable to products such as MIFARE Ultralight EV1, based on an ISO 14443-3 Type A communication protocol which uses a dedicated read command (READ SIG) to read an ECC-based signature. It should be noted that the reader installation at the customer site should support signature verification in order to execute the authentication procedure.

In particular, FIG. 2 shows exemplary steps of a procedure for authenticating a transponder. Initially, a reader device RD requests access S200 to a transponder TP. As a result, a transponder TP, which is in the range of the reader device RD will change from an idle- or halt-state S222 to a ready-state S224. Subsequently, an anti-collision and transponder selection process S202 is executed. Once the transponder TP is selected, its unique identifier UID becomes known S226 to the reader device RD and the transponder changes from the ready-state S224 to an active-state S228.

In a subsequent step, the reader device RD determines whether an originality-check service is required S204 for the transponder TP. If so, the reader device RD sends a (general or dedicated) read command S206 to the transponder TP in order to read the signature. If no originality-check service is required, the reader device RD proceeds with its service S216 without checking the originality of the transponder TP.

In a subsequent step, it is verified S230 whether the correct read command from the reader device RD has been received. If so, the transponder TP sends S232 the signature SIG to the reader device RD and remains in the active-state S228. If not, the transponder TP does not send the signature and returns to the idle- or halt-state S222.

Upon receipt S208 of the signature SIG, the reader device RD continues with the next step S212, wherein the signature SIG is verified with respect to the unique identifier UID and the public key. If the signature SIG is valid, i.e. if the signature verification step S212 yields TRUE, then the transponder TP will be declared genuine S214 and the reader device RD will proceed with its service S216. If the signature SIG is not valid, i.e. if the signature verification step S212 yields FALSE, the transponder TP will be declared fake S218 and it will be rejected S220.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

HSM-INIT HSM initialization
HSM-OP HSM operation
TEST wafer tester
DB database
PK private key
S100 generate private-public key pair
S102 backup private key
S104 export public key
S106 receive UID from wafer tester
S108 generate signature with private key
S110 send signature to wafer tester
RD reader device
TP transponder
UID unique identifier of transponder
SIG signature of transponder
S200 REQA/WUPA command
S202 ANTICOL/SELECT command
S204 authentication required?
S206 send read signature command to card
S208 receive signature from transponder
S212 verify signature
S214 transponder is authentic
S216 proceed with service
S218 transponder is not authentic
S220 reject transponder
S222 IDLE/HALT communication state
S224 READY/READY communication state
S226 send UID to reader device
S228 ACTIVE/ACTIVE communication state
S230 read signature command received and authorized?
S232 send signature to reader device

The invention claimed is:
1. A method for producing an RFID transponder, the method comprising:
  providing the RFID transponder with a transponder-specific identifier;
  providing the RFID transponder with a signature usable for authentication of the transponder; and
  generating said signature by signing at least a part of the transponder-specific identifier, wherein said signature is stored in a hidden memory of the RFID transponder, the hidden memory is configured to only be accessible by dedicated commands and prevents customers from altering the signature stored in the hidden memory, and a private key used for the signing remains stored in a secured environment at a transponder-manufacturer site.

2. The method as claimed in claim 1, wherein the signature is generated by signing at least a part of the transponder-specific identifier with a private key of a private-public key pair.

3. The method as claimed in claim 2, wherein the private-public key pair is based on any one of Elliptic Curve Cryptography, RSA cryptography, NTRU cryptography, and the Digital Signature Standard.

4. The method as claimed in claim 1, wherein the transponder-specific identifier comprises at least a part of an unique identification number of the RFID transponder.

5. The method of claim 2, wherein only a manufacturer of the RFID transponder has the private key.

6. A method for authenticating an RFID transponder, wherein the authentication is performed by:
   reading a transponder-specific identifier or a part of the transponder-specific identifier from the RFID transponder;
   reading a signature from the RFID transponder, said signature comprising the transponder-specific identifier or said part of the transponder-specific identifier in signed form and a private key used for the signing remains stored in a secured environment at a transponder-manufacturer site; and
   verifying the signature and determining that the RFID transponder is authentic only if the signature is valid, wherein said signature is read from a hidden memory from the RFID transponder by means of a dedicated command and the hidden memory is configured to only be accessible by dedicated commands and prevents customers from altering the signature stored in the hidden memory.

7. The method as claimed in claim 6, further comprising:
   generating the signature by signing the transponder-specific identifier or said part of the transponder-specific identifier with a private key of a private-public key pair; and
   verifying the signature with the public key of said private-public key pair.

8. The method as claimed in claim 7, wherein the private-public key pair is based on any one of Elliptic Curve Cryptography, RSA cryptography, NTRU cryptography, and the Digital Signature Standard.

9. The method as claimed in claim 6, wherein the transponder-specific identifier comprises at least a part of an unique identification number of the RFID transponder.

10. The method of claim 7, wherein only a manufacturer of the RFID transponder has the private key.

11. A non-transitory medium comprising instructions which, when being executed by a processing unit, carry out or control respective steps of a method for authenticating an RFID transponder, the non-transitory medium comprising:
   instructions for providing the RFID transponder with a transponder-specific identifier;
   instructions for providing the RFID transponder with a signature usable for authentication of the RFID transponder; and
   instructions for generating the signature by signing at least a part of the transponder-specific identifier, wherein the signature is stored in a hidden memory of the RFID transponder, the hidden memory is configured to only be accessible by dedicated commands and prevents customers from altering the signature stored in the hidden memory, and a private key used for the signing remains stored in a secured environment at a transponder-manufacturer site.

* * * * *